United States Patent

Kaneko et al.

[11] Patent Number: 5,097,625
[45] Date of Patent: Mar. 24, 1992

[54] SEEDING AND SEEDLING-GROWING SHEET AND SEEDING AND SEEDLING-GROWING METHOD

[75] Inventors: Tadao Kaneko; Susumu Kamijo; Norimasa Kamezawa; Teruaki Kobayashi, all of Kawasaki, Japan

[73] Assignee: Sliontec Corporation, Kanagawa, Japan

[21] Appl. No.: 613,722

[22] PCT Filed: Apr. 6, 1990

[86] PCT No.: PCT/JP90/00470
  § 371 Date: Nov. 19, 1990
  § 102(e) Date: Nov. 19, 1990

[87] PCT Pub. No.: WO90/11678
  PCT Pub. Date: Oct. 18, 1990

[30] Foreign Application Priority Data

Apr. 7, 1989 [JP] Japan .................. 1-86738

[51] Int. Cl.⁵ .................................. A01C 1/04
[52] U.S. Cl. .......................... 47/56; 47/DIG. 9; 47/1.3
[58] Field of Search ........... 111/199, 200; 47/56, 47/DIG. 9, 9, 1.3

[56] References Cited

U.S. PATENT DOCUMENTS

| | | | |
|---|---|---|---|
| 1,143,980 | 6/1915 | McComb | 47/56 |
| 2,281,927 | 5/1942 | Fischer | 47/56 |
| 2,641,298 | 6/1953 | Kinnear | 47/56 |
| 2,648,165 | 8/1953 | Nestor | 47/56 |
| 3,098,320 | 7/1963 | Estokowski | 47/56 |
| 3,445,981 | 5/1969 | Hori | 47/56 |
| 3,981,100 | 9/1976 | Weaver | 47/56 |
| 4,061,094 | 12/1977 | Cary | 111/89 |
| 4,239,010 | 12/1980 | Amburn | 111/903 |
| 4,278,625 | 7/1981 | Dedolph | 47/56 |
| 4,300,462 | 11/1981 | Wilkins | 111/91 |

FOREIGN PATENT DOCUMENTS

| | | | |
|---|---|---|---|
| 2164536 | 12/1971 | Fed. Rep. of Germany | 47/56 |
| 105893 | 5/1917 | United Kingdom | 47/56 |
| 2123663 | 2/1984 | United Kingdom | 47/56 |

OTHER PUBLICATIONS

Japanese Patent Laid-Open No. 51721/1981, no translation.

Primary Examiner—Henry E. Raduazo
Attorney, Agent, or Firm—Birch, Stewart, Kolasch & Birch

[57] ABSTRACT

The present invention is to provide a seeding and seedling growing sheet and a seeding and seedling-growing method comprising using the sheet, which are to be used for seeding and growing seedling of grain, vegetable, flower and the like, and which are suitable for efficiently seeding at a desirable position and a desirable density with a higher positional precision and for promoting the growth at germination, by employing the seeding and seedling-growing adhesive sheet comprising a sheet support body composed of water-soluble or water-dispersible paper or water-soluble polymer film, an adhesive agent containing a powdery ferromagnetic substance being coated in spots or in stripes on the support body, and by applying the seeding and seedling-growing method comprising using the adhesive sheet.

4 Claims, 1 Drawing Sheet

GROWING LENGTH OF MAIN ROOT (mm/15h)

SEEDING AND SEEDLING-GROWING SHEET AND SEEDING AND SEEDLING-GROWING METHOD

TECHNICAL FIELD

The present invention relates to a seeding and seedling-growing sheet and a seeding and seedling-growing method to be used for seeding and growing seedling of grain, vegetable, flower and the like. More specifically, the present invention relates to a seeding and seedling-growing adhesive sheet suitable for efficiently seeding at a desirable position and a desirable density with a higher positional precision and for promoting the growth at germination, and seeding and seedling-growing method comprising using the sheet.

BACKGROUND OF THE INVENTION

It has been known a method of magnetic treatment of crop seeds as one method for improvement including facilitating the growth of crops such as grain, vegetable, flower and the like, improving the crop thereof, and adapting them to their growing environment. For example, Japanese Patent Laid-open No. 51721/1981 discloses a method of magnetic treatment comprising exposing seed in dry state to a single-pole magnetic field of 600 to 3500 Gauss and rotating or shaking the seed for a period of 5 seconds to 14 hours. The Japanese Patent Laid-open describes in detail the results of growing seeds of corn, Japanese radish and the like through magnetic treatment under variable conditions concerning the intensity of a magnetic flux density, the type of single magnetic field, i.e., N pole and S pole, the exposing time, as well as the change in the plant properties. However, as the apparatus for magnetic treatment, apparatuses utilizing permanent magnet and electromagnet are employed in the method, and it has been hard in the steps of germination and seedling growing to apply efficient magnetic treatment in consistent manner for a certain period of time.

Furthermore, the effect of magnetic treatment of facilitating growth of seeds of barley and wheat is reported by U. J. Pittmam, in Can. J. Plant Sci. 57 pp 37–45 (1976).

On the other hand, the seeding work of grain, vegetable, flower and the like has conventionally been carrid out manually, but the recent decrease in the number of farmers as well as the progress of their aging involves the enhanced importance of improving the seeding method. Furthermore, as seeds have not had uniform quality ordinarily, there has been taken a working procedure such that once seeds of the excessive number than necessary are planted, the germinating plants are thinned out. However, the recent remarkable improvement in the quality of seeds and their germinating ratio caused by the progress in $F_1$ seed hybridization needs the dramatic decrease in seeding amount.

Additionally, in the hydroponic culture of which application field has recently been enlarged rapidly, there has been employed a procedure comprising placing a predetermined number of seeds on a small area seedling-growing mat including one made of urethane form, at predetermined interval, and permanently planting the seedlings after germinating the seeds and growing the seedlings, wherein seeding is generally done manually since seeds are in a wide variety of size and shape.

Because the conventional techniques have some problems insofar mentioned, the expectation toward their improvement has been intense. The objective of the present invention is to solve the problems involved in the conventional techniques and to provide a seeding and seedling-growing sheet and a seeding and seedling-growing method, capable of efficiently and continuously promoting growth of germinating seeds and seedlings and efficiently placing seeds at a desirable position of a seedling-growing mat or a seedling-growing bed, at a desirable density with a higher positional precision.

SUMMARY OF THE INVENTION

The objective described above can be achieved by employing as a seedling and seedling-growing adhesive sheet, the one comprising a sheet-form base material composed of water-soluble or water-dispersible paper or water-soluble polymer film, an adhesive agent containing a powdery ferromagnetic substance being coated in spots or in stripes on the base sheet, and by applying a seeding and seedling-growing method comprising using the adhesive sheet.

FIG. 4 is a graph representing the results of the experiments for determining the relationship between the growing length of roots and the direction of magnetic flux, when a magnetic field was applied to corn seeds at germination and the seedlings thereof at growth, where the axis of ordinate shows the growing length of main roots when 15 hours passed after their rooting; the axis of abscissa shows each case of (B) no application of magnetic field (control), (C) the growing direction of main roots conforming to the direction of the magnetic flux from magnetic N pole to S pole (magnetic flux density; 500 Gauss), (D) turning adverse the direction of magnetic flux, and (E) placing the growing direction of main roots orthogonal to the magnetic flux (the magnetic flux density was the same in (C)). The results shown in the figure indicate that the growth facilitation results in (C), (D) and (E), by about 27%, about 22%, and about 15% compared with (B), respectively. These suggest, than in case that an adhesive agent of the adhesive agent layer arranged on a seeding and seedling-growing adhesive sheet contains a powdery ferromagnetic substance, there can be obtained continuous and efficient effects of growth promotion on the seeds placed on the adhesive agent layer. As the powdery ferromagnetic substance hereinabove described, there can be used ferrite such as needle-like $\gamma$-iron oxide, cobalt-containing $\gamma$-iron oxide, surface-inactivated iron powder in various forms, and the like. The intensity of a magnetic field may be controlled by changing the intensity a magnetic field for magnetization other than the type and content of a ferromagnetic substance in an adhesive agent. The powdery ferromagnetic substance may be magnetized prior to its mixing into an adhesive agent. In order to readily realize its homogeneous mixing into an adhesive agent and to enhance the effects of magnetic field application, an adhesive agent mixed with a powdery ferromagnetic substance is preferably coated on a base material and then the substance is magnetized at a desirable direction, specifically so as to set the direction of magnetic flux orthogonal to the growing directin of main roots.

On the other hand, by arranging adhesive agent layers in spots or in stripes on a carrier sheet, a predetermined number of seeds can be placed on a predetermined position on the sheet. In case of placing seeds in spots on a base material, for example, an adhesive sheet on which is coated in spots an adhesive agent of a desirable size and a adhesive form, is used. In such case, in order that a desirable number of seeds can be placed per coated area, depending on the size and form of a seed to be placed, the size and form of a part to be coated with an adhesive sheet may be predetermined.

Seeds are placed onto a seeding and seedling-growing adhesive sheets as follows. That is, the placing of seeds can be done by uniformly dispersing seeds over the surface of the adhesive agent-coated side of the adhesive sheet, and subsequently removing the seeds on the portions other than the adhesive agent-coated part by the procedure such as slanting the adhesive sheet, to make the seeds bonded only on the adhesive agent-coated part, or it can be done by uniformly placing a great amount of seeds in a flat container, putting the adhesive sheet with its adhesive-agent coated surface being held downward over the seeds, press bonding the adhesive sheet by a roller and the like to bond the seeds only on the adhesive agent-coated part.

Germination of seeds and growing seedling can be performed by watering the adhesive sheet where seeds are placed in the above manner and which is placed on a seedling-growing mat or seedling-growing bed, or by further covering the sheet with water-soluble or water-dispersible sheet and watering the sheet.

The spot-like coating of an adhesive agent onto a sheet-form base material can be easily carried out by general transfer coating comprising firstly coating an adhesive agent on a released paper by printing technique, drying the agent, and transferring the agent onto a sheet, in cases that an adhesive agent is diluted with an organic solvent, and also that the agent is diluted with water.

Figure 1:
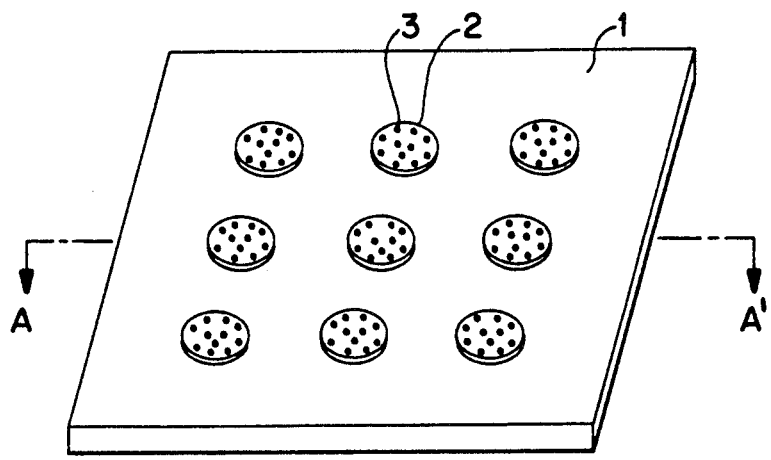
FIG. 1 is a partially enlarged perspective view of the rough constitution of an embodiment of the seeding and seedling-growing adhesive sheet of the present invention.

1: Sheet-form base material
2: adhesive agent
3: powdery forromagnetic substance
4: seed
5: line of magnetic force
6: main root.

PREFERRED EMBODIMENT OF THE INVENTION

EXAMPLE 1

FIG. 1 is a partially enlarged perspective view of the rough constitution of an embodiment of the seeding and seedling-growing adhesive sheet of the present invention, representing that the adhesive sheet is composed of a sheet-form base material 1 and an adhesive agent 2 coated in spots thereon, and that a powdery ferromagnetic substance is contained in the adhesive agent 2.

The adhesive agent 2 herein is the solution of an adhesive agent comprising the following;

| | |
|---|---|
| 2-Ethylhexylacrylate | 96.0 part |
| Acrylic acid | 4.0 part |
| Ethyl acetate | 248.0 part |
| Benzoyl peroxide | 0.62 part. |

To the solution was added 25% by weight of a non-magnetized powdery ferrite ferromagnetic substance (cobalt-containing γ-iron oxide), of a particle size of about 2 μm, and then stirred, and after placing the solution subsequently in a magnetic field to magnetize the powdery ferromagnetic substance, the solution was coated in spots onto a sheet 1 (water soluble paper) and dried to yield a seeding and seedling-growing adhesive sheet.

Seeds of Komatuna (*Brassica Rapa* var. pervidis) were placed on the adhesive agent 2 of the seeding and seedling-growing adhesive sheet prepared as has been described above, which was arranged on seedling-growing mat for germination and seedling growing. Consequently, the result such that the growing length of main roots increased by 15%, 15 hours after the seeds rooted, compared with the case that an adhesive sheet formed without adding any powdery ferromagnetic substance to a solution of an adhesive agent.

Figure 2:
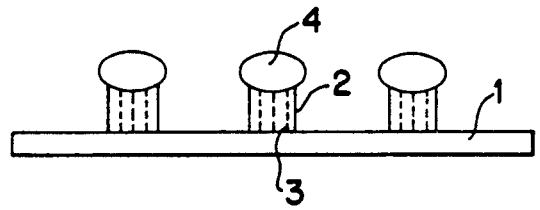
FIG. 2 is a schematic cross section along the line A—A' of the seeding and seedling-growing sheet of FIG. 1, in the state of placing seeds on the adhesive agent.

FIG. 2 is a figure representing schematically the cross sectional view of the seeding and seedling-growing sheet of FIG. 1 in the state where seeds 4 are placed on the adhesive sheet 2.

EXAMPLE 2

The present embodiment is an example of the case where a solution of an adhesive agent, to which was added a non-magnetized powdery ferromagnetic substance, was coated in spots on a base material before magnetization of the powdery ferromagnetic substance, wherein a solution of an adhesive agent containing the powdery non-magnetized ferromagnetic substance, prepared in the same manner as in the case of Sample 1, was coated onto a base sheet before drying, and the adhesive sheet was passed through air gap of an electromagnet with a magnetic field intensity adjusted to a predetermined value (for example, 500 Gauss) holding it so as to the base side of the layer become S-pole, to magnetize the ferromagnetic substance.

Figure 3:
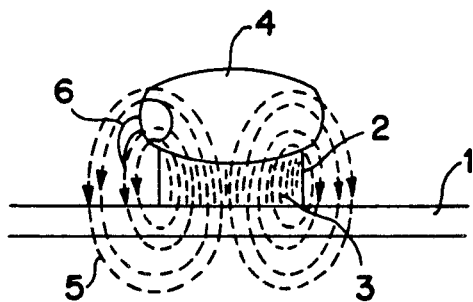
FIG. 3 is a schematic cross section representing the relation between the growing direction of main roots of placed seeds on Sample 2 of the seeding and seedling-growing sheet of the present invention and the direction of the line of magnetic line of force.
Figure 4:
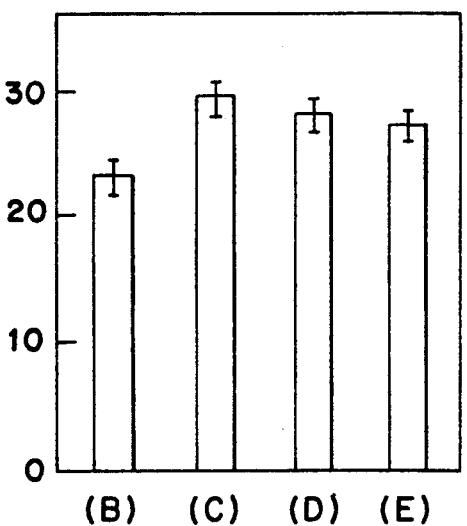
FIG. 4 is a graph representing the experimental results of the relation between the growing length of main roots at crop seed germination and seedling growth and the applied magnetic field.

Seeds of Komatuna (*Brassica Rapa* var. pervidis) were placed on the adhesive agent of the seeding and seedling-growing adhesive sheet prepared as has been described above, which was arranged on seedling-growing mat for germination and seedling growing. Consequently, the result such that the growing length of main roots increased by 27-28%, 15 hours after the seeds rooted, compared with the case that an adhesive sheet formed without adding any powdery ferromagnetic substance to a solution of an adhesive agent. Because the direction of magnetic line of force 5 obtained from the powdery ferromagnetic substance 3 in the adhesive agent 2 is in the same direction of the growing direction of main roots 6 rooting from the seeds 4 in the present case, as is shown in the schematic cross section of FIG. 3, the growth of the main roots is specifically promoted.

The case of using Komatuna seeds as the seed have been explained in the cases of Samples 1 and 2 described above, and the same results were obtained when different species of seeds (for example, seeds of lettuce, corn, etc.) were used.

What is claimed is:

1. Seeding and seedling-growing adhesive sheet comprising an adhesive agent layer arranged on a sheet-like base material wherein the adhesive agent layer is an adhesive layer in which an adhesive agent containing a powdery ferromagnetic substance is arranged in spots or in stripes on the base material.

2. The seeding and seedling-growing sheet according to claim 1, wherein said sheet-form base material is a sheet-form base material composed of water-soluble or water-dispersible paper or water-soluble polymer film.

3. The seeding and seedling-growing adhesive sheet according to claim 1, wherein the powdery ferromagnetic substance is a powdery ferromagnetic substance magnetized so as to turn the base side of the adhesive agent layer into S-pole.

4. Seeding and seedling-growing method, comprising placing seeds on an adhesive-agent-coated part of a seeding and seedling-growing adhesive sheet comprising arranging an adhesive agent containing a powdery ferromagnetic substance in spots or in stripes on a sheet-form base material, and putting the seed-placed adhesive sheet on a seedling-growing mat or a seedling-growing bed to germinate seeds and grow seedlings.

* * * * *